United States Patent
Braun et al.

(10) Patent No.: US 8,006,903 B2
(45) Date of Patent: Aug. 30, 2011

(54) PROXIMITY-BASED INVENTORY MANAGEMENT SYSTEM USING RFID TAGS TO AID IN DISPENSING AND RESTOCKING INVENTORY

(75) Inventors: Patrick J. Braun, Pittsburgh, PA (US); Joseph Sallustio, Pittsburgh, PA (US)

(73) Assignee: McKesson Automation, Inc., Cranberry, PA (US)

( * ) Notice: Subject to any disclaimer, the term of this patent is extended or adjusted under 35 U.S.C. 154(b) by 580 days.

(21) Appl. No.: 11/965,878

(22) Filed: Dec. 28, 2007

(65) Prior Publication Data

US 2009/0166415 A1    Jul. 2, 2009

(51) Int. Cl.
*G06F 19/00* (2006.01)
*G06Q 30/00* (2006.01)
*G66Q 90/00* (2006.01)

(52) U.S. Cl. .................. 235/385; 235/383; 235/375
(58) Field of Classification Search .................. 235/385, 235/383, 375, 487, 454; 705/14, 1; 283/62, 283/66.1, 48
See application file for complete search history.

(56) References Cited

U.S. PATENT DOCUMENTS

| | | |
|---|---|---|
| 4,717,042 A | 1/1988 | McLaughlin |
| 4,785,969 A | 11/1988 | McLaughlin |
| 4,847,764 A | 7/1989 | Halvorson |
| 5,014,875 A | 5/1991 | McLaughlin et al. |
| 5,190,185 A | 3/1993 | Blechl |
| 5,314,243 A | 5/1994 | McDonald et al. |
| 5,346,297 A | 9/1994 | Colson, Jr. et al. |
| 5,377,864 A | 1/1995 | Blechl et al. |
| 5,405,048 A | 4/1995 | Rogers et al. |
| 5,431,299 A | 7/1995 | Brewer et al. |
| 5,460,294 A | 10/1995 | Williams |
| 5,468,110 A | 11/1995 | McDonald et al. |
| 5,480,062 A | 1/1996 | Rogers et al. |
| 5,520,450 A | 5/1996 | Colson, Jr. et al. |
| 5,564,803 A | 10/1996 | McDonald et al. |
| 5,593,267 A | 1/1997 | McDonald et al. |
| 5,661,978 A | 9/1997 | Holmes et al. |
| D384,578 S | 10/1997 | Wangu et al. |
| 5,713,485 A | 2/1998 | Liff et al. |
| 5,716,114 A | 2/1998 | Holmes et al. |
| 5,745,366 A | 4/1998 | Higham et al. |
| 5,761,877 A | 6/1998 | Quandt |

(Continued)

OTHER PUBLICATIONS

International Search Report and Written Opinion for PCT/US06/22660 mailed Sep. 25, 2007.

(Continued)

*Primary Examiner* — Edwyn Labaze
(74) *Attorney, Agent, or Firm* — Alston & Bird LLP (57) ABSTRACT

An apparatus is provided that includes a processor configured to operate a software application, which is configured to receive selection of a number of discrete groups into which to divide a plurality of identified products. The products are located at respective storage locations in a collection of storage locations. The software application is therefore configured to divide the identified products into discrete groups such that the areas of the resulting groups of products at respective storage locations are substantially non-overlapping. The software application is further configured to assign the groups of products to respective workstation computers, each of which is configured to generate and transmit, for each of one or more of the products of a respective group, a signal to an associated RFID tag to thereby direct the RFID tag to generate a notification signal. A method and a computer program product for managing inventory are also provided.

27 Claims, 8 Drawing Sheets

U.S. PATENT DOCUMENTS

| | | |
|---|---|---|
| 5,797,515 A | 8/1998 | Liff et al. |
| 5,805,456 A | 9/1998 | Higham et al. |
| 5,842,976 A | 12/1998 | Williamson |
| 5,878,885 A | 3/1999 | Wangu et al. |
| 5,880,443 A | 3/1999 | McDonald et al. |
| 5,883,806 A | 3/1999 | Meador et al. |
| 5,893,697 A | 4/1999 | Zini et al. |
| 5,905,653 A | 5/1999 | Higham et al. |
| 5,912,818 A | 6/1999 | McGrady et al. |
| 5,927,540 A | 7/1999 | Godlewski |
| 5,940,306 A | 8/1999 | Gardner et al. |
| 5,971,593 A | 10/1999 | McGrady |
| 6,003,006 A | 12/1999 | Colella et al. |
| 6,011,999 A | 1/2000 | Holmes |
| 6,021,392 A | 2/2000 | Lester et al. |
| 6,039,467 A | 3/2000 | Holmes |
| 6,065,819 A | 5/2000 | Holmes et al. |
| 6,068,156 A | 5/2000 | Liff et al. |
| 6,109,774 A | 8/2000 | Holmes et al. |
| 6,112,502 A | 9/2000 | Frederick et al. |
| 6,116,461 A | 9/2000 | Broadfield et al. |
| 6,151,536 A | 11/2000 | Arnold et al. |
| 6,170,230 B1 | 1/2001 | Chudy et al. |
| 6,176,392 B1 | 1/2001 | William et al. |
| 6,189,727 B1 | 2/2001 | Shoenfeld |
| 6,223,934 B1 | 5/2001 | Shoenfeld |
| 6,256,967 B1 | 7/2001 | Hebron et al. |
| 6,283,322 B1 | 9/2001 | Liff et al. |
| 6,289,656 B1 | 9/2001 | Wangu et al. |
| 6,330,459 B1 | 12/2001 | Crichton et al. |
| 6,338,007 B1 | 1/2002 | Broadfield et al. |
| 6,339,732 B1 | 1/2002 | Phoon et al. |
| 6,361,263 B1 | 3/2002 | Dewey et al. |
| 6,370,841 B1 | 4/2002 | Chudy et al. |
| 6,449,927 B2 | 9/2002 | Hebron et al. |
| 6,471,089 B2 | 10/2002 | Liff et al. |
| 6,497,342 B2 | 12/2002 | Zhang et al. |
| 6,499,270 B2 | 12/2002 | Peroni et al. |
| 6,532,399 B2 | 3/2003 | Mase |
| 6,563,417 B1 | 5/2003 | Shaw |
| 6,564,121 B1 | 5/2003 | Wallace et al. |
| 6,581,798 B2 | 6/2003 | Liff et al. |
| 6,609,047 B1 | 8/2003 | Lipps |
| 6,611,733 B1 | 8/2003 | De La Huerga |
| 6,625,952 B1 | 9/2003 | Chudy et al. |
| 6,636,780 B1 | 10/2003 | Haitin et al. |
| 6,640,159 B2 | 10/2003 | Holmes et al. |
| 6,650,964 B2 | 11/2003 | Spano, Jr. et al. |
| 6,671,579 B2 | 12/2003 | Spano, Jr. et al. |
| 6,681,149 B2 | 1/2004 | William et al. |
| 6,742,671 B2 | 6/2004 | Hebron et al. |
| 6,755,931 B2 | 6/2004 | Vollm et al. |
| 6,760,643 B2 | 7/2004 | Lipps |
| 6,776,304 B2 | 8/2004 | Liff et al. |
| 6,785,589 B2 | 8/2004 | Eggenberger et al. |
| 6,790,198 B1 | 9/2004 | White et al. |
| 6,814,254 B2 | 11/2004 | Liff et al. |
| 6,814,255 B2 | 11/2004 | Liff et al. |
| 6,847,861 B2 | 1/2005 | Lunak et al. |
| 6,874,684 B1 | 4/2005 | Denenberg et al. |
| 6,892,780 B2 | 5/2005 | Vollm et al. |
| 6,895,304 B2 | 5/2005 | Spano, Jr. et al. |
| 6,975,922 B2 | 12/2005 | Duncan et al. |
| 6,985,797 B2 | 1/2006 | Spano, Jr. et al. |
| 6,996,455 B2 | 2/2006 | Eggenberger et al. |
| 7,010,389 B2 | 3/2006 | Lunak et al. |
| 7,014,063 B2 | 3/2006 | Shows et al. |
| 7,016,766 B2 | 3/2006 | William et al. |
| 7,040,504 B2 | 5/2006 | Broadfield et al. |
| 7,052,097 B2 | 5/2006 | Meek, Jr. et al. |
| 7,072,737 B2 | 7/2006 | Lunak et al. |
| 7,072,855 B1 | 7/2006 | Godlewski et al. |
| 7,077,286 B2 | 7/2006 | Shows et al. |
| 7,085,621 B2 | 8/2006 | Spano, Jr. et al. |
| 7,092,796 B2 | 8/2006 | Vanderveen |
| 7,093,755 B2 | 8/2006 | Jordan et al. |
| 7,100,792 B2 | 9/2006 | Hunter et al. |
| 7,103,419 B2 | 9/2006 | Engleson et al. |
| 7,111,780 B2 | 9/2006 | Broussard et al. |
| 7,139,639 B2 | 11/2006 | Broussard et al. |
| 7,150,724 B2 | 12/2006 | Morris et al. |
| 7,171,277 B2 | 1/2007 | Engleson et al. |
| 7,218,231 B2 | 5/2007 | Higham |
| 7,228,198 B2 | 6/2007 | Vollm et al. |
| 7,249,688 B2 | 7/2007 | Hunter et al. |
| 7,348,884 B2 | 3/2008 | Higham |
| 7,417,729 B2 | 8/2008 | Greenwald |
| 7,419,133 B2 | 9/2008 | Clarke et al. |
| 7,426,425 B2 | 9/2008 | Meek, Jr. et al. |
| 7,448,544 B1 * | 11/2008 | Louie et al. .................. 235/385 |
| 7,504,449 B2 * | 3/2009 | Mazor et al. .................. 524/369 |
| 7,554,449 B2 | 6/2009 | Higham |
| 7,571,024 B2 | 8/2009 | Duncan et al. |
| 7,588,167 B2 | 9/2009 | Hunter et al. |
| 2003/0099158 A1 | 5/2003 | De la Huerga |
| 2004/0188523 A1 * | 9/2004 | Lunak et al. .................. 235/385 |
| 2004/0225409 A1 | 11/2004 | Duncan et al. |
| 2005/0096963 A1 * | 5/2005 | Myr et al. ...................... 705/10 |
| 2006/0092072 A1 * | 5/2006 | Steiner ............................ 342/46 |
| 2007/0023513 A1 * | 2/2007 | Andreasson et al. ......... 235/385 |
| 2008/0055084 A1 * | 3/2008 | Bodin et al. ................ 340/572.1 |
| 2008/0284566 A1 * | 11/2008 | Zai et al. ..................... 340/7.56 |

OTHER PUBLICATIONS

International Preliminary Report on Patentability for PCT/US2006/022660 mailed Dec. 27, 2007.

Office Action from U.S. Appl. No. 11/423,326, mailed Aug. 25, 2010.

Office Action for U.S. Appl. No. 11/423,326 dated Feb. 8, 2011.

* cited by examiner

PROXIMITY-BASED INVENTORY MANAGEMENT SYSTEM USING RFID TAGS TO AID IN DISPENSING AND RESTOCKING INVENTORY

FIELD OF THE INVENTION

Exemplary embodiments of the present invention are directed toward inventory management systems and, more particularly, to inventory management systems which use radio frequency identification (RFID) tags to aid in dispensing and restocking of inventory.

BACKGROUND OF THE INVENTION

Medical facilities, such as hospitals, nursing homes, and the like, have a centralized location such as a pharmacy department or materials management department within the facility to coordinate the dispensing of drugs or medical supplies to the patients of the medical facility. The departments utilizing medications and medical supplies in such facilities have long been burdened with the increasingly complex record keeping and inventory management that results from caring for hundreds, if not thousands, of patients every day. Various methods have been employed to assist a centralized pharmacy or other centralized medical supply departments with maintaining accurate records while attempting to reduce the burden of managing all of the information associated with the distribution of medications and medical supplies. The responsibilities of the centralized supply include: filling individual patient prescriptions on a daily basis; administering drugs using the five rights: right drug, right patient, right dose, right time and right route, dispensing medical supplies to patients; maintaining sufficient inventory of each drug or medical supply so as to have sufficient quantities on hand to administer to patients on a daily basis; tracking of drug interactions to prevent a patient from being given a drug that has adverse affects when combined with other drugs; accounting for the purchase of medications and medical supplies for use in the facility; accounting associated with dispensing of medications and medical supplies to individual patients; tracking of medication expiration dates to rid inventories of expired medications; and tracking of drug lot numbers, for example, in the event of a recall of a particular drug or drug lot number.

Medical facilities will dispense medications in one of three modes: centralized, decentralized, or a hybrid of partial decentralization. In facilities that are partly or fully decentralized, a very important function of the centralized pharmacy or materials management department is to restock various inventory locations, e.g., nurses stations, unit-based cabinets, satellite pharmacies, or off-site facilities in a network, with the quantity and types of medications and medical supplies that must be dispensed by the decentralized locations on a daily basis.

Replenishing the inventory in a centralized hospital-wide nursing unit-based cabinet (UBC) system is a time consuming, laborious, and often awkward process for pharmacy departments. The typical manual pick process using paper-based replenishment reports is certainly not optimal. In the typical manual pick process, a hard copy report is generated manually. The pharmacy technician or worker responsible for filling the orders works from the hard copy report is required to pick the requested items. This process is time consuming and complex. Patient barcode labels are generally not used. Additionally, the manual pick process requires significant staff training and practice as well as inventory memorization. The accuracy and safety of the picks are ensured by a manual check of the medications against the dispensing list. Additionally, restocking and billing requires the manual count of medications and completion of paperwork. Finally, medication inventory management is performed by manual, time-consuming counts and replenishments must be ordered manually. Thus, pharmacy departments are very interested in a better way of managing their current UBC replenishment processes.

Automated systems for dispensing and restocking inventory are currently used in pharmacies in place of the manual pick process. For example, "pick-to-light" technology or a "place-to-light" may be used. Both of these systems involve the use of specially designed, hardwired workstations and pharmacy units. While these systems offer substantial advantages over the manual pick process, some facilities may not have the resources to convert to such an automated system and basically reengineer the whole pharmacy. Therefore, the need exists for an automated inventory management system that improves workflow, safety and cost efficiency to hospital pharmacies of any size volume or staffing level.

SUMMARY OF THE INVENTION

In light of the foregoing background, exemplary embodiments of the present invention provide an improved system and method for managing inventory. Exemplary embodiments of the present invention utilize RFID technology to direct the illumination of RFID tags placed on medication storage locations within a pharmacy pick-station to indicate the medication to select for the order being processed. Exemplary embodiments of the present invention may enhance medication safety through RFID-enabled guiding light technology. The system may allow pharmacies to continue to use their existing medication-shelving units. The system may also include RFID tags that easily attach to existing medication bins as well as antennas that communicate with the RFID tags and the system's workflow software. And further, the system may permit multiple users to dispense and/or restock inventory in a manner that reduces the likelihood of those users crossing paths as they traverse the medication bins housing that inventory.

According to one aspect of the present invention, an apparatus is provided that includes a processor configured to operate a software application. The software application is configured to receive selection of a number of discrete groups into which to divide a plurality of identified products (e.g., medications of one or more fill orders), such as by receiving selection of a number of users to be tasked with dispensing and/or replenishing inventory for the respective products. The products are located at respective storage locations in a collection of storage locations (e.g., medication bins supported by shelving units). The software application is therefore configured to divide the identified products into discrete groups such that the areas of the resulting groups of products at respective storage locations are substantially non-overlapping. In this regard, the software application may be configured to divide the identified products into discrete groups each including substantially the same number of products. In various other instances, the software application may be configured to divide the identified products into discrete groups including numbers of products determined based upon efficiency ratings associated with respective users, at least one group including a greater number of products than at least one other group.

The products may be located at respective storage locations in a collection of storage locations arranged in a matrix including one or more columns and one or more rows of storage locations, such as in bins supported by a plurality of shelving units. In such instances, the software application being configured to divide the identified products may include being configured to divide the shelving units, or the columns or rows of storage locations, into discrete groups.

Regardless of exactly how the discrete groups are formed, the software application may be further configured to assign the groups of products to respective workstation computers, each of which may be configured to generate and transmit, for each of one or more of the products of a respective group, a signal to an associated RFID tag to thereby direct the RFID tag to generate a notification signal, such as by activating a light emitting diode (LED). In this regard, the workstation computers may be configured to transmit signals to RFID tags via one or more of a plurality of selectable antennas, where the antennas are selectable based on a signal strength associated with each of the antennas. Users may therefore dispense and/or replenish inventory according to the notification signal, and by dividing the products into discrete, substantially non-overlapping groups, in a manner whereby the users may be less likely to cross paths as they traverse the medication bins housing their respective products.

According to another aspect of the present invention, an apparatus is provided that includes a processor configured to operate a software application, and a mobile cabinet configured to carry the processor; the mobile cabinet and processor carried by the mobile cabinet being movable relative to a plurality of bins housing a respective plurality of products. The software application of this aspect is configured to generate and transmit, for each of one or more of the products, a signal to a RFID tag associated with the bin housing the respective product to thereby direct the RFID tag to generate a notification signal, such as by activating a LED. The apparatus of this aspect may further include one or more selectable antennas coupled to the processor to enable communication between the software application and one or more radio frequency identification (RFID) tags. The software application may then be configured to transmit, for each of one or more of the products, a signal to a respective RFID tag via the selectable antenna(s), where the antenna(s) are selectable based on a signal strength associated with each of the antennas.

According to other aspects of the present invention, a method and computer-readable storage medium are provided. Exemplary embodiments of the present invention therefore provide an apparatus, method and computer-readable storage medium for managing inventory utilizing RFID technology. As indicated above, and explained below, exemplary embodiments of the present invention may solve problems identified by prior techniques and provide additional advantages.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. For example, references may be made herein to directions and orientations including right and left; it should be understood, however, that any direction and orientation references are simply examples and that any particular direction or orientation may depend on the particular object, and/or the orientation of the particular object, with which the direction or orientation reference is made. Like numbers refer to like elements throughout.

Figure 1:
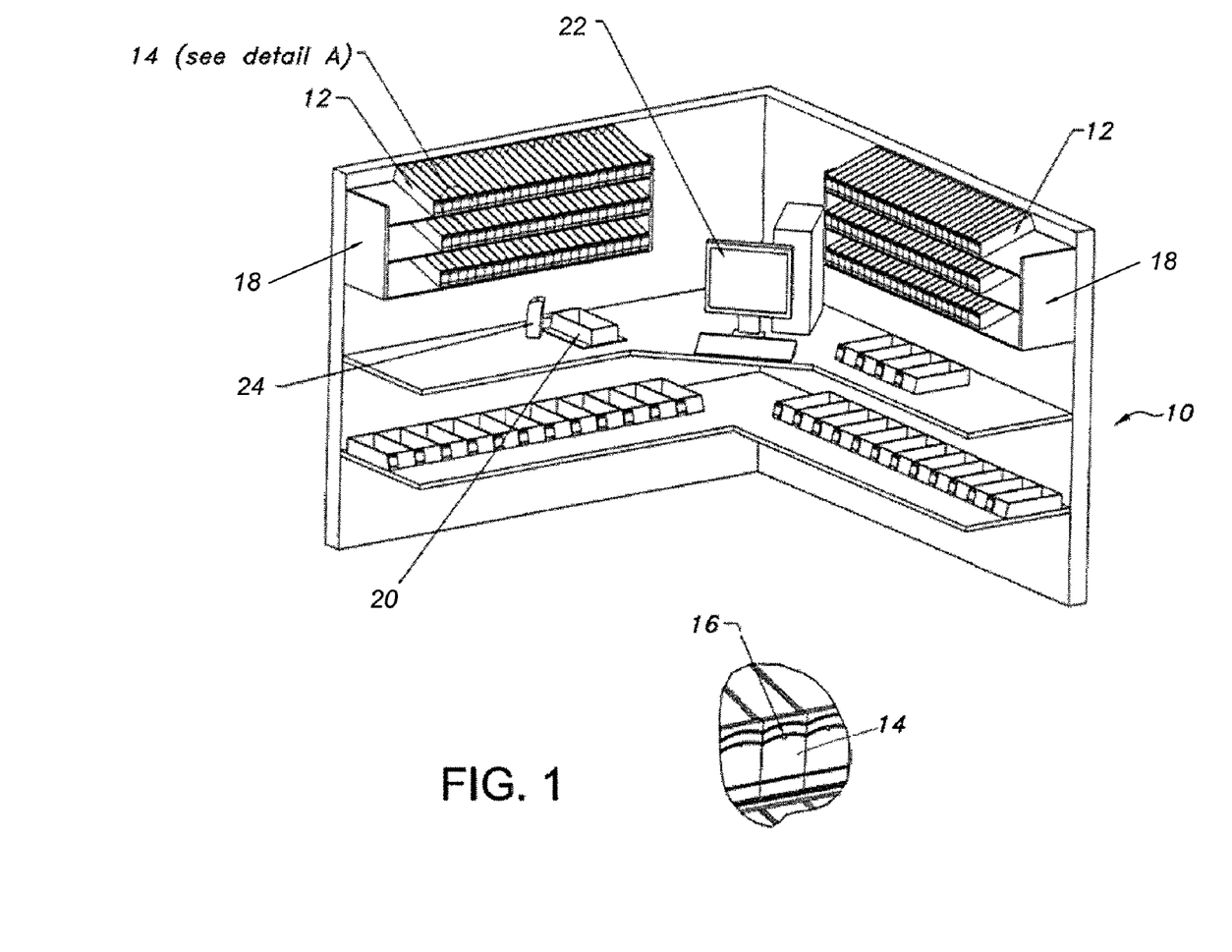
FIG. 1 is one example of a pharmacy pick-station or workstation, configured according to exemplary embodiments of the present invention.

FIG. 1 illustrates an example of one type of system that may be configured according to exemplary embodiments of the present invention. The system, method and computer program product of exemplary embodiments of the present invention will be primarily described in conjunction with medication supply applications. It should be understood, however, that the system, method and computer program product of exemplary embodiments of the present invention can be utilized in conjunction with a variety of other applications, both in the medication supply industry and outside of the medication supply industry. In this regard, the system, method and computer program product of exemplary embodiments of the present invention may generally be implemented in any of a number of inventory management applications dealing with the dispensing and/or restocking of inventory, or more particularly inventory of a plurality of separate products (e.g., medications). For more information on a system that may be configured according to exemplary embodiments of the present invention, see U.S. patent application Ser. No. 11/423,326, entitled: Inventory Management System using RFID Tags to Aid in Dispensing and Restocking Inventory, filed Jun. 9, 2006, the content of which is incorporated by reference in its entirety.

More particularly, FIG. 1 is a diagram illustrating one example of a pharmacy pick-station utilizing exemplary embodiments of the present invention. Those of ordinary skill in the art will recognize that the present invention may be utilized in various other workstation configurations. The workstation 10 includes medication storage locations or medication bins 12. Each medication bin is capable of housing a particular medication or supply. The bins may be organized in any of a number of different manners, but in one exemplary embodiment, may be alphabetically organized according to the medications housed in the respective bins (see, e.g., FIG. 6). "Medication" is used herein in its broadest sense to mean not only all types of pills, gelcaps and the like, but creams or ointments dispensed in tubes, patches, among others.

Figure 2:
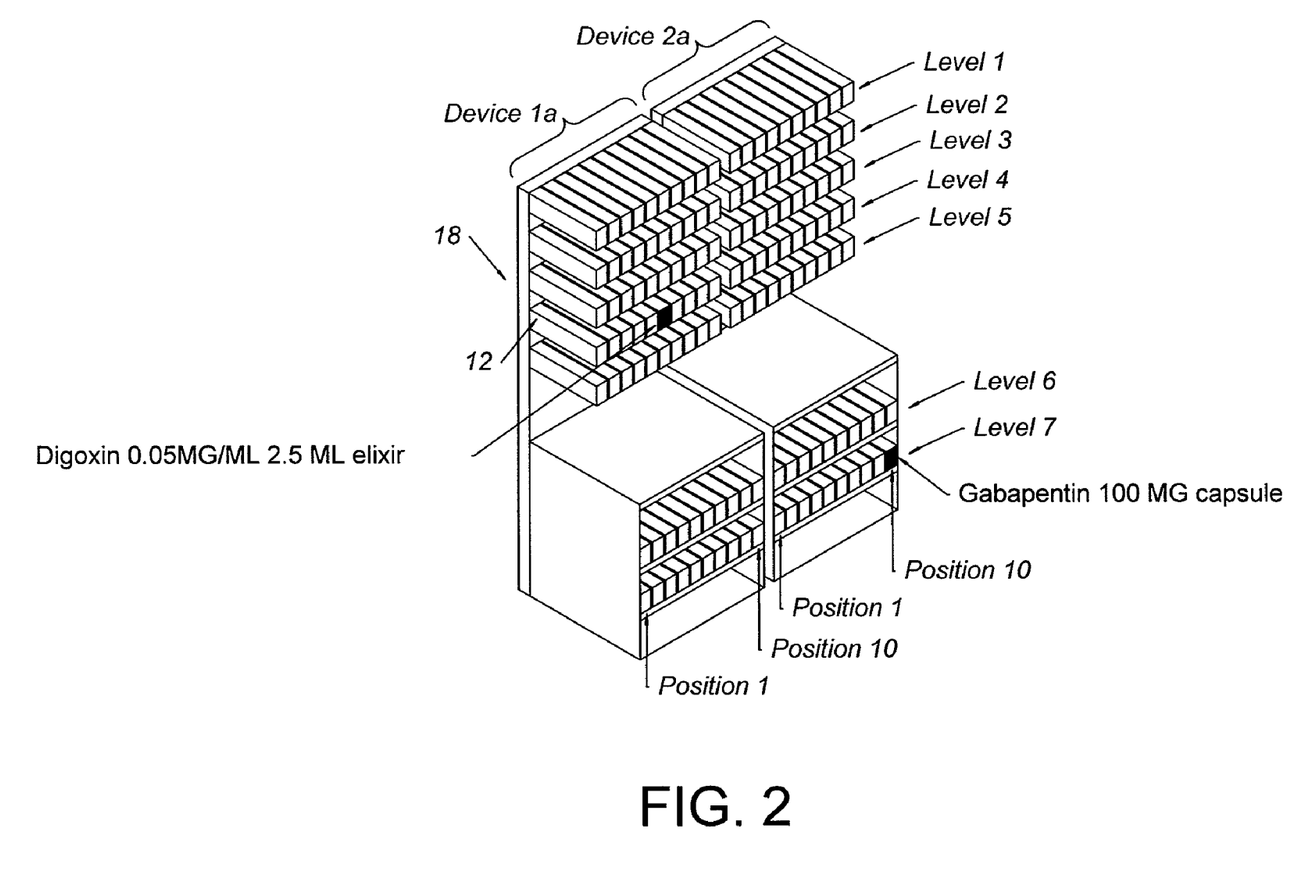
FIG. 2 is a schematic block diagram of a shelving unit supporting a plurality of medication bins, according to exemplary embodiments of the present invention.

According to exemplary embodiments of the present invention, a unique location identifier (ID) may be assigned to each drug dose within a medication bin 12 of the workstation 10. In this regard, the location ID for a particular medication or dose may include device, level and position data that identify the shelving-unit 18, shelf and bin, respectively, housing the respective medication/dose. As shown in FIG. 2, for example, consider a workstation including two shelving-units, each having seven shelves, each of which supports a row of ten bins. Each shelving unit may be referred to as a "device," each shelf a "level," and each bin a "position," where a device (shelving unit) may be considered a matrix of bins, the levels of which form the rows of the matrix, and the positions of which form the columns of the matrix. For example, Digoxin 0.05 MG/ML 2.5 ML elixir may have an ID of 1A:4:6 (Device: 1A; Level: 4; Position 6) and Gabapentin 100 MG capsule may have an ID of 2A:7:10 (Device:2A; Level:7; Position 10) (devices A and B here reflecting a shelving-unit that may have multiple sub-units).

An RFID tag 14 containing an LED light 16 (see detail A) is placed on each medication bin 12. RFID tag 14 may also contain a barcode (not shown). An example of one type of RFID tag that may be used is the i-D2 tags, available from Identec Solutions, Inc., Kelowna, B.C. The RFID tags are not hard-wired, and therefore, they can be placed anywhere, including on the existing pharmacy medication shelving-units 18. Each RFID tag is capable of being associated with a unique identification number associated with the medication housed in the corresponding medication bin, such as the National Drug Code (NDC) number or Drug Identification Number (DIN) of the medication. The software application used with the system, which includes one or more computer program instructions stored in a memory and executed by a processing element, such as a computing device, may store an IP address associated with each RFID tag and NDC number of the medication housed in the corresponding medication bin. Each RFID tag may additionally include a barcode associated with the NDC number of the medication housed in the corresponding medication bin. In addition, each RFID tag may include a liquid crystal display (LCD), which may be used, for example, to display identification information associated with the medication housed in the corresponding medication bin, as well as a quantity of the medication that should be selected in order to fill a particular order (collection of one or more products—e.g., medications) being processed. Each workstation 10 may also include patient bins 20 for depositing all of the medication required to fill a particular patient order, and one or more workstation computers 22, each of which may be associated with a unique ID. The workstation may include one or more antennas (not shown) coupled to the workstation computer to thereby enable communication between the software and the RFID tags. The antennas may be flat ceiling mounted antennas (i.e., patch antennas), whip antennas, or other similar antennas, located on the ceiling above the workstation. Alternatively, one or more rotatable antennas may be used. The rotatable antennas may be physically rotatable, have rotational waveguides attached thereto, or be electronically actuated in multiple planes.

Figure 3:
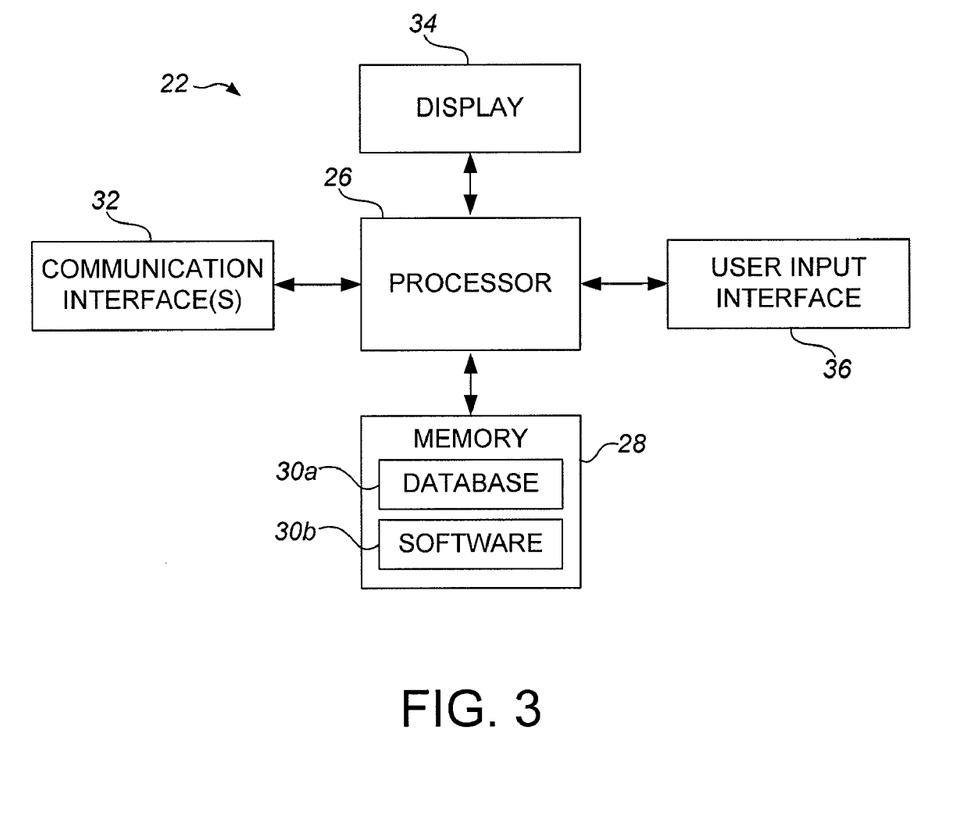
FIG. 3 is a schematic block diagram of a workstation computer according to exemplary embodiments of the present invention.

Referring to FIG. 3, a block diagram of one type of workstation computer 22 configured according to exemplary embodiments of the present invention is provided. Generally, the workstation computer of exemplary embodiments of the present invention may comprise, include or be embodied in one or more processing elements, such as one or more of a laptop computer, desktop computer, workstation computer, server computer or the like. Additionally or alternatively, the workstation computer may comprise, include or be embodied in one or more portable electronic devices, such as one or more of a mobile telephone, portable digital assistant (PDA), pager or the like.

As shown in FIG. 3, the workstation computer 22 of one exemplary embodiment of the present invention may include a processor 26 connected to a memory 28. The memory can comprise volatile and/or non-volatile memory, and typically stores content, data or the like, such as in one or more databases 30a. In this regard, the memory may store content transmitted from, and/or received by, the workstation computer. The memory may also store one or more software applications 30b, instructions or the like for the processor to perform steps associated with operation of the entity in accordance with exemplary embodiments of the present invention (although any one or more of these steps may be implemented in any combination software, firmware or hardware). These software applications may include, for example, Connect-Rx® software available from McKesson Automation Inc., Cranberry Township, Pa., USA.

The processor 26 may also be connected to at least one interface or other means for displaying, transmitting and/or receiving data, content or the like. In this regard, the interface(s) may include at least one communication interface 32 or other means for transmitting and/or receiving data, content or the like, such as to and/or from other devices (e.g., other workstation computers) and/or networks coupled to the workstation computer 22. In this regard, the workstation computer 22 may be coupled to one or more networks, including one or more wireline and/or wireless local area networks (LANs), wide area networks (WANs) (e.g., the Internet) or the like.

In addition to the communication interface(s) 32, the interface(s) may also include at least one user interface that may include one or more wireline and/or wireless (e.g., Bluetooth) earphones and/or speakers, a display 34 (workflow display, computer monitor, etc.), and/or a user input interface 36. The user input interface, in turn, may comprise any of a number of wireline and/or wireless devices allowing the entity to receive data from a user, such as a microphone, an image or video capture device, a keyboard or keypad, a joystick, the aforementioned barcode scanner 24 or other input device.

Figure 4:
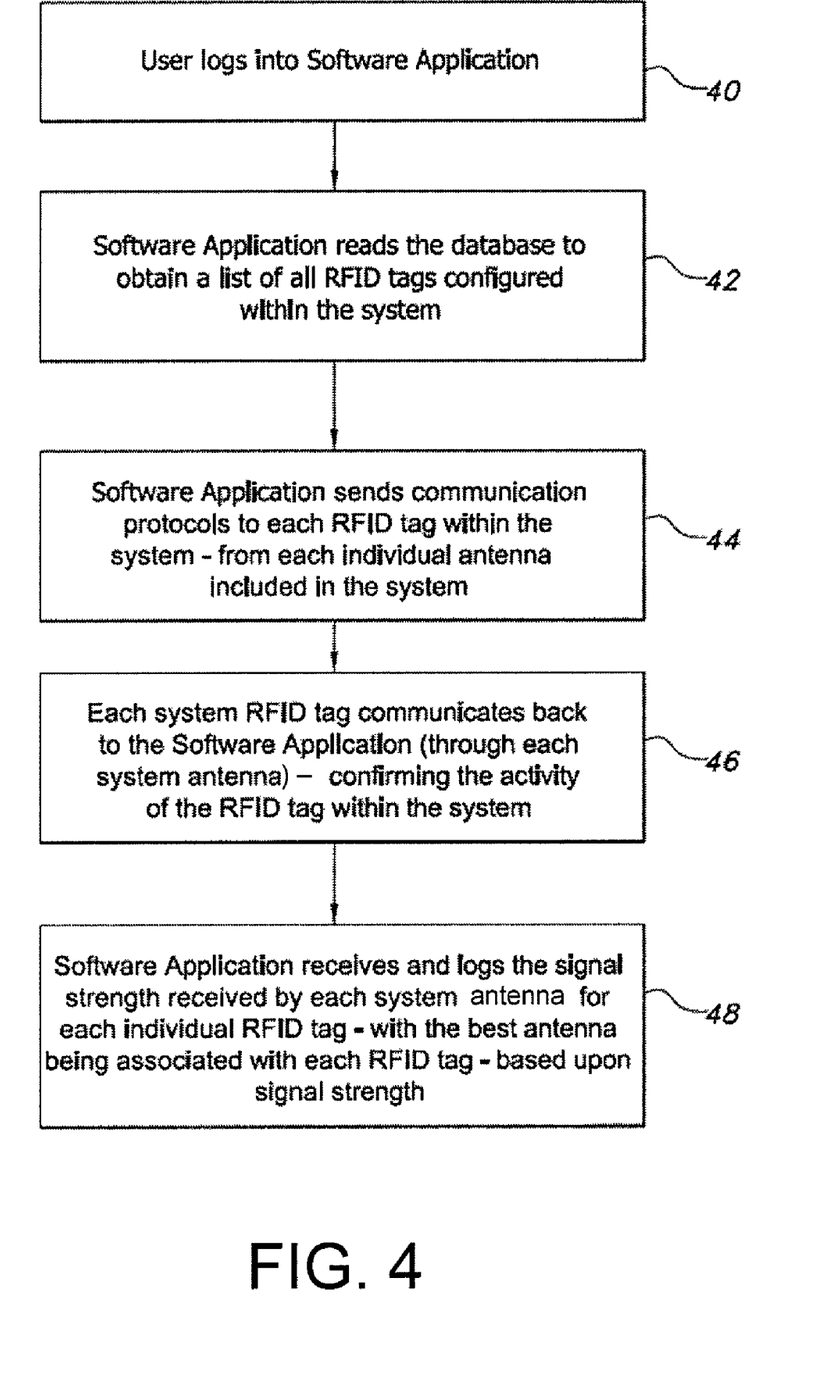
FIG. 4 is a flowchart illustrating various steps in a method of interrogating one or more antennas, according to exemplary embodiments of the present invention.

FIG. 4 illustrates various steps in a method of interrogating one or more antennas upon, for example, start-up. This method allows a workstation computer 22, or more particularly a software application 30b of the workstation computer, upon start up or at other times such as when inventory is moved, to interrogate each of the antennas to determine which antenna has the strongest signal connection with each RFID tag 14. Oftentimes obstructions such as cabinets, people, carts or the like can block the signal between an antenna and an RFID tag. Upon start-up, the workstation computer may interrogate the antennas to measure the signal strength of each antenna to each RFID tag. The workstation computer may store this information. That is, for each RFID tag the workstation computer may maintain a list of antennas according to signal strength. The antenna with the strongest signal strength to a particular RFID tag may be referred to as the "best antenna" for that particular RFID tag. When an order is selected for fill, the workstation computer may communicate (e.g., directly via another computer, server or the like) with the "best antenna," i.e., that antenna having the strongest signal strength with the RFID tag associated with that particular medication. If the antenna from that signal fails to communicate with the RFID tag, the workstation computer may communicate with the antenna having the next strongest signal strength with the RFID tag associated with that particular medication, and so on, until communication occurs.

At block 40 of FIG. 4, the interrogation method may begin when a user logs into a workstation computer 22, or more particularly the software application 30b of a workstation computer. Upon log-in, at block 42, the software application 30b may read the database 30a to obtain a list of all RFID tags 14 configured within the system. At block 44, the software application may send communication protocols to each RFID tag within the system from each individual antenna included in the system. At block 46, each system RFID tag may communicate back to the software application through each system antenna confirming the activity of the RFID tag within the system. The software application may receive and log (at block 48) the signal strength received by each system antenna for each individual RFID tag, with the best antenna being associated with each RFID tag based upon signal strength.

Figure 5:
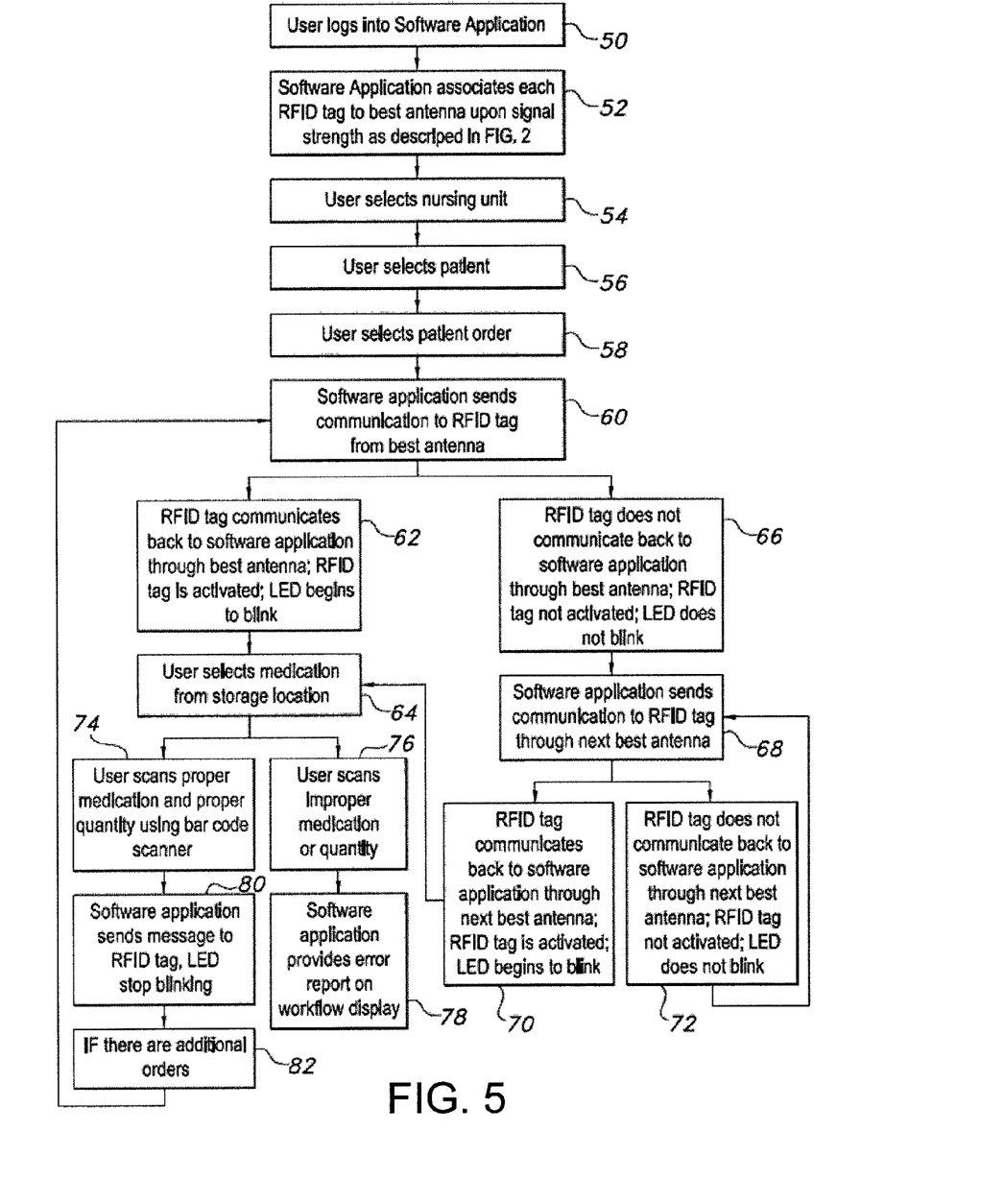
FIG. 5 is a flowchart illustrating various steps in a method of processing one or more fill orders, according to exemplary embodiments of the present invention.

FIG. 5 is a flowchart illustrating various steps in a method of processing fill orders. At block 50, the user may log into a workstation computer 22, or more particularly the software application 30b of a workstation computer. The software application may associate (at block 52) each RFID tag 14 with the best antenna based upon signal strength as described in connection with FIG. 4. The user may then select (at block 54) a nursing unit to open for processing. In response, the display 34 of the respective workstation computer may present a list of all patients for the selected nursing unit with patient orders to be filled. The user may then select (at block 56) a patient from the opened nursing unit list. In one exemplary embodiment, upon selecting a nursing unit to open for processing, the barcode labels associated with each patient corresponding with that unit may be printed. In this exemplary embodiment, selecting a patient with patient orders to be filled may include scanning the barcode label associated with that patient. Once selected, the display may present a list of all patient orders (i.e., medications) to process. The user may then select (at block 58) a patient order from the selected patient's list of orders to process. In one exemplary embodiment, the system may automatically select the first patient order associated with the selected patient to be processed.

Regardless of how a patient order is selected, as an order is selected for processing, the software application 30b may communicate (at block 60) to the appropriate RFID tag 14 through the best antenna for that RFID tag. The RFID tag associated with the selected medication for the active order (at block 62) may then communicate back to the software application through the best antenna to acknowledge communication. At the same time, the RFID tag may be activated and the embedded LED on the RFID tag may begin to blink, thus directing the user to the proper medication storage location. In one exemplary embodiment, the LCD associated with the respective RFID tag may display the quantity of the medication that should be selected in order to fill the order being processed. The user (at block 64) may then select medication from the storage location associated with the blinking LED. The RFID tags may employ notification schemes other than a blinking LED, if desired.

If, at block 66, the software application 30b does not receive acknowledgement from the selected RFID tag 14, the software application may attempt to communicate (at block 68) with the RFID tag through the next best antenna based upon signal strength determined during the system activation/interrogation. The RFID tag associated with the selected medication for the active order (at block 70) may communicate back to the software application through the next best antenna to acknowledge communication. Once the RFID tag is activated and the embedded LED begins to blink, the user (at block 64) may select the medication from the storage location associated with the blinking RFID tag. If, at block 72, the software application does not receive acknowledgement from the selected RFID tag, the software application may attempt to communicate (at block 68) with the RFID tag through the next best antenna.

Once the user (at block 64) selects medication from the storage location, the user may scan (at block 74) the proper medication and proper quantity into the software application utilizing a barcode scanner. Such information may be manually entered if the selected medication is not barcoded. If the user scans (at block 76) the incorrect medication or quantity for the active order, the software application may provide an error warning (at block 78) to the user on the workflow display or computer monitor, indicating that the incorrect medication or quantity was selected and allow the user to correct the order. Once the user scans (at block 74) the appropriate quantity of appropriate medication for the active order, the software application 30b (at block 80) may send a message to the current RFID tag 14, through the best antenna, indicating that the current RFID tag can discontinue blinking the RFID tag LED. If (at block 82) there are additional orders within the selected patients' profile, the system application may then communicate to the next RFID tag utilizing the same process above, until all of the patient's orders are completed. The software application may maintain a running list of completed orders, and if so desired, provide a status as to the patient's orders to the user.

Figure 6:
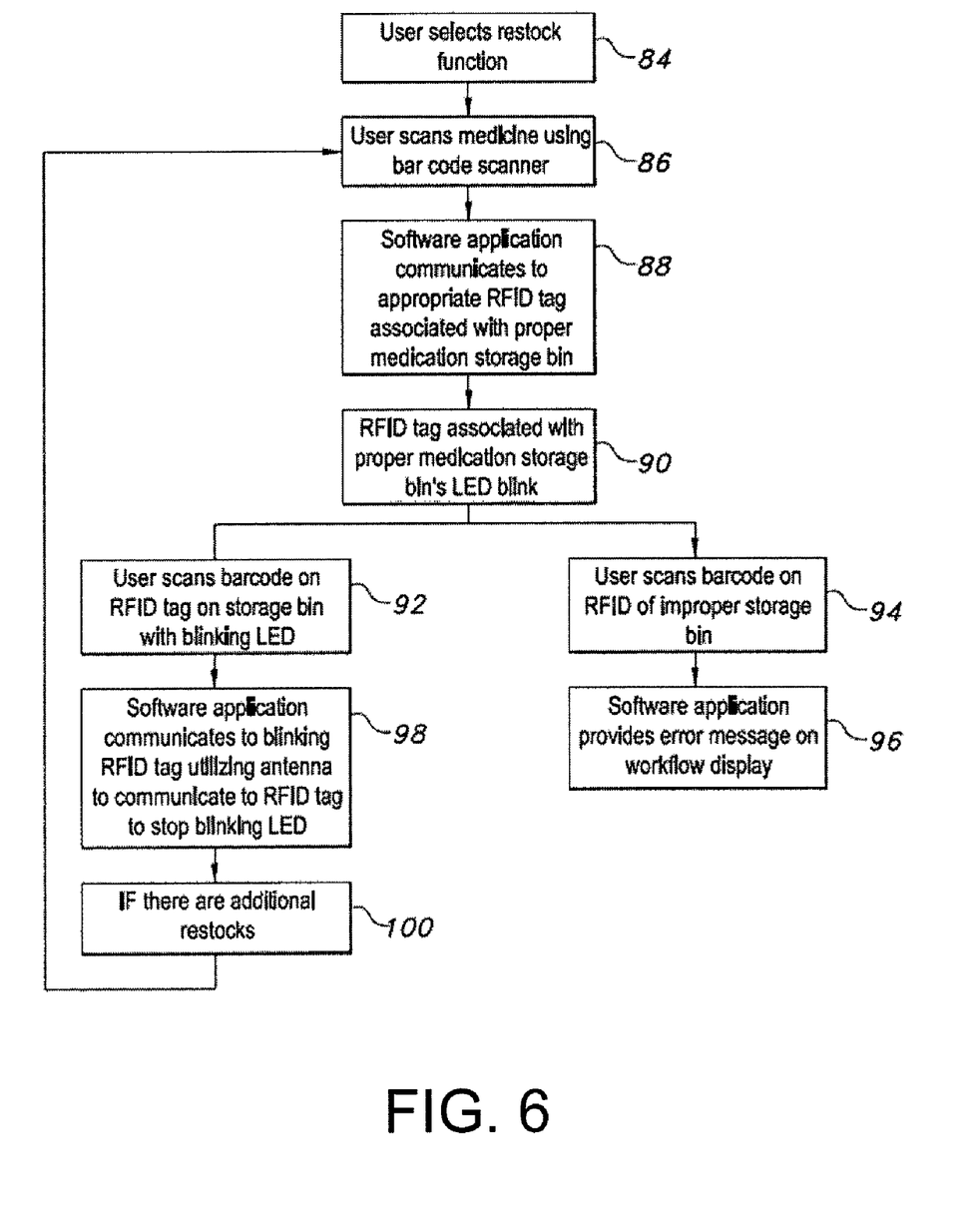
FIG. 6 is a flowchart illustrating various steps in a method of restocking of medications.

FIG. 6 is a flowchart illustrating various steps in a method of restocking of medications. The user (at block 84) may select the restock function from the software application. The user (at block 86) may then scan the medication to restock utilizing the system's barcode scanner. The software application 30b (at block 88) may communicate to the appropriate RFID tag 14 associated with the proper medication storage location for the scanned medication utilizing the best antenna. The RFID tag associated with the proper medication storage location (at block 90) may begin to blink the embedded LED tag. The user may then place the medication in the storage location identified by the blinking LED tag. The user (at block 92) may scan the barcode associated with the blinking RFID tag, indicating that the medication was placed into the proper storage location. If the user (at block 94) scans the barcode on a RFID tag of an improper storage bin, the software application (at block 96) may provide an error message if an incorrect medication storage location is scanned for the selected medication to restock. Once the proper RFID tag is scanned, the software application (at block 98) may communicate to the blinking RFID tag, utilizing the best antenna to indicate to the RFID tag to discontinue blinking the RFID tag LED. The user may be given the ability to update the inventory of this location at this time. The user (at block 100) may continue with the above process until all medications are restocked.

Figure 7:
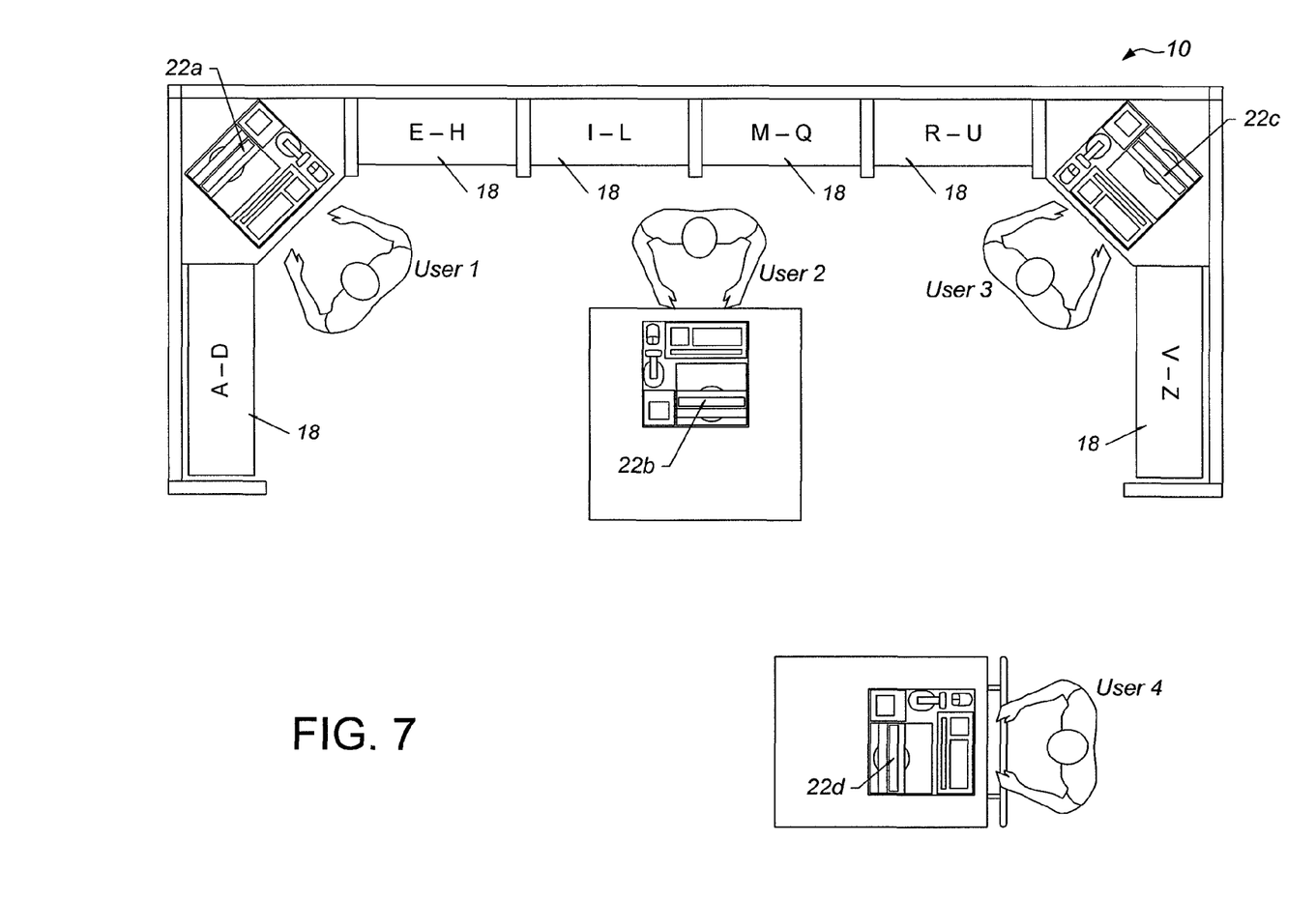
FIG. 7 is another example of a pharmacy pick-station or workstation, configured according to exemplary embodiments of the present invention.

As suggested above, and now illustrated by FIG. 7, a workstation 10 may include more than one workstation computer 22 (four workstation computers being shown as 22a-22d). Each workstation computer may be configured for processing fill orders by respective users in an at least partially overlapping manner. In such instances, the workstation computers may be configured to independently operate separate instances of the software application 30b. Alternatively, the workstation computers may be configured to operate separate instances of the software application at least partially under control of another workstation computer or another computer (not shown) configured to operate another instance of the software application or some other software application configured to manage instances of the software application. As explained herein, then, although reference may be generally made to the software application, it should be understood that this software application may comprise an instance of the software application configured for processing fill orders, as well as directing operation of other instances of the software application in processing fill orders; or a separate software application configured for directing operation of instances of the software application configured for processing fill orders.

As shown in FIG. 7, the workstation 10 may include one or more workstation computers 22d carried by one or more respective mobile cabinets, carts or the like. This mobile workstation computer may be configured in a manner similar to other, fixed workstation computers (three shown as computers 22a-22c). The cabinet carrying the mobile workstation computer may include an arrangement of one or more drawers (e.g., an alphabetized drawer arrangement) capable of carrying multiple items, including medications or the like. In addition, the cabinet may include or otherwise carry one or more antennas (not shown) coupled to the mobile workstation computer to thereby enable communication between the software and the RFID tags. Such a mobile workstation computer therefore enables the system to include one or more additional medication bins 12 (e.g., on one or more additional shelving units 18) situated outside the immediate area of the workstation.

The mobile workstation computer 22d may be operated in any of a number of different manners. In one embodiment, for example, medications (for one or more patient orders) housed in medication bins 12 located outside the immediate area of the workstation 10 may be assigned to the mobile workstation computer, such as in a batch mode. The user may then retrieve and place those medications in an appropriate drawer of the cabinet. Once the user has gathered at least some, if not all of the medications, the user may return the cart to the workstation area, and redistribute the medications into respective patient bin(s) 20.

As explained above, fill orders may be processed on a per-patient basis. In the context of multiple users filling respective orders, however, those users may interfere with one another as the users traverse the medication bins 12, particularly in instances in which the bins are alphabetically organized according to the medications housed in the respective bins. In accordance with another aspect of the present invention, then, the software application 38b may be configured to divide the medications of one or more patient fill orders into a number of discrete groups (or clusters) corresponding to the number of users filling those order(s), the medications being divided such that the areas of the resulting groups of medications within their respective medication bins (at respective storage locations) are substantially non-overlapping. Portions of the patient fill order(s) including the respective groups of medications may then be filled by the users, such as in a manner similar to that explained above with respect to FIG. 5. By dividing the medications into discrete groups such that the areas of the resulting groups of medications within their respective medication bins are substantially non-overlapping, however, the users may be less likely to cross paths as they traverse the medication bins housing their assigned medications.

The software application 38b may be configured to divide the medications of one or more patient fill orders into discrete groups based on one or more of the following: (a) the number of users filling the respective orders, (b) the storage locations (medication bins 12) of the medications of the respective orders, or (c) efficiency ratings associated with respective users. In this regard, the medications may be divided into discrete groups in any of a number of different manners, such as by dividing (into discrete groups) the shelving units 18 supporting the medication bins housing the medications, the shelves or positions of the medication bins across the shelving units (rows or columns in a matrix of bins formed from the matrices of bins across the shelving units), or even the bins themselves. The medication groups may then be assigned to the workstation computers 22 to be used in filling the order(s), such as based on the proximity of the groups to those computers.

The medication bins 12, shelves, positions or shelving units 18 may be divided into discrete groups including substantially the same number of medication bins housing medications of the order(s) to be filled, or substantially the same number of medication bins regardless of those bins housing medications of the order(s) to be filled. Alternatively, the medication bins, shelves, positions or shelving units may be divided into discrete groups including one or more groups with more medication bins than one or more other groups, such as based on efficiency ratings associated with respective users reflecting that more efficient users may be capable of filling orders at a higher rate (and thus handle greater number of medication bins) than less efficient users.

In one more particular but less complex example, the shelving units 18 may be divided into discrete groups, each including substantially the same number of units regardless of the medication bins 12 housing medications of the order(s) to be filled. In another more particular but more complex example, the medication bins housing medications of the order(s) to be filled may be divided into discrete groups by clustering of those mediation bins based on the Euclidean distance of those bins to the workstation computers 22 to be used in filling the order(s). In either event, however, the medication bins (and hence the medications) may be divided into groups such that areas of the resulting groups of medications within the shelving units are substantially non-overlapping (allowing for some overlap of the respective areas depending on the manner by which the medications are divided).

Figure 8:
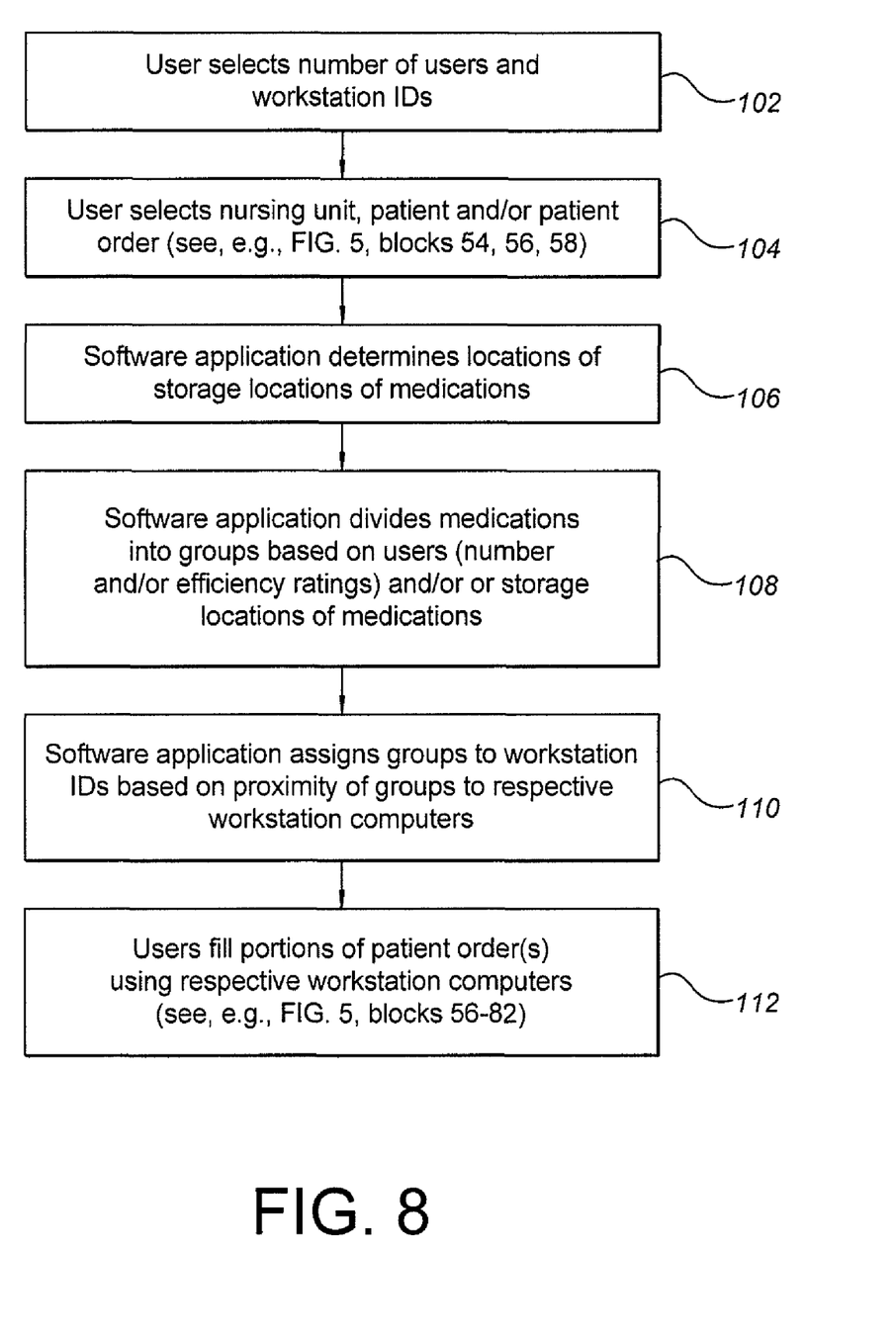
FIG. 8 is a flowchart illustrating various steps in a method of dividing medications of one or more fill orders (dividing units of inventory for one or more pluralities of units of inventory), particularly in the context of processing those fill orders as described with reference to FIG. 5.

FIG. 8 is a flowchart illustrating various steps in a method of dividing medications of one or more fill orders (dividing units of inventory for one or more pluralities of units of inventory), particularly in the context of processing those fill orders as described with reference to FIG. 5. It should be understood, however, that the method of FIG. 8 may be equally applicable to restocking of medications, such as in the manner described above with reference to FIG. 6.

As shown at block 102, the method may include a user selecting the number of users and, if so desired, the particular users and/or workstation IDs of the workstation computers 22 to be used by the users in filling one or more patient orders. In this regard, the software application 30b may be configured to receive a selection of a number of users and then, in response, present (by display 34) a list of particular users and/or workstation computers from which the user may select the particular users and/or workstation computers to be used by the users.

Before, after or as the user selects the number of users and, if so desired, the particular users and/or workstation IDs, the user may select (at block 104) a nursing unit (collection of patients, each with one or more orders to be filled), a patient (with one or more orders to be filled) or a patient order to be filled (see, e.g., FIG. 5, blocks 54, 56, 58). In this regard, selecting a nursing unit permits the software application to divide the medications of the patient orders of the patients of the selected nursing unit, selecting a patient permits the software application to divide the medications of the patient orders of the selected patient, and selecting a patient order permits the software application to divide the medications of the selected patient order. As a further example, the user may instead select one or more patient orders to be filled in a given time period, such as over the course of a given day. For purposes of further description (and without limitation), however, the remaining steps of the method generally refer to the user selecting one or more patient orders to be filled.

At block 106, the software application 30*b* may determine the storage locations of the medications (locations of the respective medication bins 12) of the patient order(s) to be filled. More particularly, for example, the software application may determine the location IDs (device, level and position data) for the respective medications. Then, at block 108, the software application may divide the medications into discrete groups corresponding to the selected number of users, and such that the areas of the resulting groups of medications within their respective storage locations are substantially non-overlapping. In this regard, the software application may divide the medications into discrete groups in any of a number of different manners, as explained above.

After dividing the medications, at block 110, the software application 30*b* may assign the discrete groups of medications to the selected workstation IDs based on the proximity of those groups to respective workstation computers 22, such as by assigning the discrete groups of medications to respective workstation computers deemed closest to those groups. In this regard, memory 28 of the workstation computer or other computer operating the software application assigning the medications to workstation IDs (or other memory accessible to the software application) may store data reflecting the positions of, or relative distances between, the workstation computers and the medication bins 12, shelves or positions of the medication bins across the shelving units 18, or the shelving units themselves. Consider, for example, the context of grouping medications by shelving units 18 supporting the medication bins 12 housing the medications, the shelves or positions of the medication bins across the shelving units (rows or columns in a matrix of bins formed from the matrices of bins across the shelving units), or even the bins themselves. In such instances, the software application 30*b* may, for example, assign the group including the leftmost/rightmost shelving unit/shelf/position/bin to the leftmost/rightmost, selected workstation computer 22 (or more generally, assign a first of an ordered set of shelving units/shelves/positions/bins to the first of a corresponding ordered set of workstation computers). The software application may then repeat the assignments for the remaining groups and workstations, assigning the leftmost/rightmost shelving unit/shelf/position/bin of the remaining groups to the leftmost/rightmost, selected workstation computer of the remaining workstation computers.

Regardless of exactly how the software application 30*b* assigns the discrete groups of medications to the selected workstation IDs, and thus the selected workstations, the method of processing fill orders may then proceed for each selected workstation and group of medications, such as in a manner as explained above with respect to FIG. 5 (see, e.g., blocks 56-82). In this regard, as each group of medications includes a portion of one or more fill orders, the method of processing fill orders for each workstation may proceed in a manner similar to that of FIG. 5 except that the workstation now fills portions of one or more orders instead of the full orders.

More particularly, for example, presume that the user selected a nursing unit and directed the software application to divide, into groups, the medications of the patient orders of the patients of the selected nursing unit (see, e.g., FIG. 5, block 54). After the software application assigns the discrete groups of medications to selected workstation IDs, the display 34 of the respective workstation computer 22 may present a list of all patients for the selected nursing unit with partial patient orders to be filled by the respective user. The user may then select (see block 56) a patient from the opened nursing unit list, and may select (see block 58) a partial patient order from the selected patient's list of partial orders to process by the respective user. Similar to before but now as to each selected workstation computer and partial patient order, as a partial order is selected for processing, the software application may communicate (see block 60) to the appropriate RFID tag 14 through the best antenna for that RFID tag. Alternatively, the software application of the workstation computer (or more generally the software applications of the respective workstation computers) may communicate with another computer, server or the like, which in turn, may communicate to the appropriate RFID tag. The method may then continue similar to before for the users of respective workstation computers to fill the partial order(s) including medications in their respective groups of medications (see blocks 62-82). Thereafter, the partial orders may be compiled into full orders to thereby complete processing of the orders for the selected nursing unit.

The software application 30*b* may maintain a running list of completed partial orders and/or full orders, and if so desired, provide a status as to the patients' partial orders and/or orders to one or more of the users. The software application may be further configured to adaptively adjust the discrete groups of medications in terms of the medications in each group and/or the number of groups. In this regard, if a user is called away from the user's workstation computer 22, the software application may adaptively adjust or otherwise regroup the medications of the respective order(s) to reduce the number of discrete groups by one.

As explained above, the user may select (at block 102 of FIG. 8) the particular workstation IDs of the workstation computers 22 to be used by the users in filling one or more patient orders. It should be understood, however, that one or more particular workstation computers may instead be assigned by the software application 30*b*. The workstation computers may be assigned in a number of different manners. For example, the software application may assign workstation computers in accordance with a default ordering of workstation computers to be assigned to increasing numbers of groups of medications. Additionally or alternatively, for example, the software application may assign workstation computers based on the proximity of the workstation computers to the discrete groups of medications, such as by assigning each workstation computer to the closest group of medication (or closest among those computers/groups not already assigned).

As explained above, after dividing the medications (at block 108 of FIG. 8), the software application 30*b* may assign the discrete groups of medications to the selected workstation IDs based on the proximity of those groups to respective workstation computers 22, with the workstations thereafter proceeding to process fill orders based on those groups, such as in a manner similar to that of FIG. 5. It should be understood, however, that in various instances, the discrete groups may be output by the software application in any of a number of other manners. For example, the software application may direct a viewable and/or printable report for each of the discrete groups. This report, then, may be supplied to respective users to fill portions of one or more orders instead of the full orders based on those discrete groups.

According to one exemplary aspect of the present invention, the functions performed by one or more of the entities of the system, such as all or portions of the workstation computers 22, may be performed by various means, such as hardware and/or firmware, including those described above, alone and/or under control of a computer program or computer software (e.g., the software application 30b). The computer program may be part of a computer program product for performing one or more functions of exemplary embodiments of the present invention. This computer program product may include a computer-readable storage medium, such as the non-volatile storage medium, and software including computer-readable program code portions, such as a series of computer instructions, embodied in the computer-readable storage medium.

In this regard, FIGS. 4-6 and 8 are flowcharts of apparatuses, methods and program products according to exemplary embodiments of the present invention. It will be understood that each block or step of the flowcharts, and combinations of blocks in the flowcharts, can be implemented by various means, such as hardware, firmware, and/or software including one or more computer program instructions. As will be appreciated, any such computer program instructions may be loaded onto a computer or other programmable apparatus to produce a machine, such that the instructions which execute on the computer or other programmable apparatus (i.e., hardware) create means for implementing the functions specified in the block(s) or step(s) of the flowcharts. These computer program instructions may also be stored in a computer-readable memory that can direct a computer or other programmable apparatus to function in a particular manner, such that the instructions stored in the computer-readable memory produce an article of manufacture including instruction means which implement the function specified in the block(s) or step(s) of the flowcharts. The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the block(s) or step(s) of the flowcharts.

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

Many modifications and other embodiments of the inventions will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:
a processor configured to operate a software application, the software application being configured to receive selection of a number of discrete groups into which to divide a plurality of identified products, the products being located at respective storage locations in a collection of storage locations,
wherein the software application is configured to divide the identified products into discrete groups such that the areas of the resulting groups of products at respective storage locations are substantially non-overlapping in a plane normal to a plane traversed by users to access the respective storage locations in the collection of storage locations.

2. An apparatus according to claim 1, wherein the software application is configured to divide the identified products into discrete groups each including substantially the same number of products.

3. An apparatus according to claim 1, wherein the products are located at respective storage locations in a collection of storage locations arranged in a matrix including one or more columns and one or more rows of storage locations, and wherein the software application being configured to divide the identified products includes being configured to divide the columns or rows of storage locations into discrete groups.

4. An apparatus according to claim 1, wherein the products are located in bins at respective storage locations, the bins being supported by a plurality of shelving units, and wherein the software application being configured to divide the identified products includes being configured to divide the shelving units into discrete groups.

5. An apparatus according to claim 1, wherein the software application is configured to assign the groups of products to respective workstation computers, each workstation computer being configured to generate and transmit, for each of one or more of the products of a respective group, a signal to a radio frequency identification (RFID) tag associated with the storage location of the respective product to thereby direct the RFID tag to generate a notification signal.

6. An apparatus according to claim 5, wherein the software application is configured to assign the groups of products to respective workstation computers each of which is configured to generate and transmit, for each of one or more of the products of a respective group, a signal to a RFID tag associated with the storage location of the respective product to thereby direct the RFID tag to activate a light emitting diode to thereby generate a notification signal.

7. An apparatus according to claim 5, wherein the software application is configured to assign the groups of products to respective workstation computers each of which is configured to transmit, for each of one or more of the products of a respective group, a signal to a RFID tag via one or more of a plurality of selectable antennas, the antennas being selectable based on a signal strength associated with each of the antennas.

8. An apparatus comprising:
a processor configured to operate a software application, the software application being configured to receive selection of a number of discrete groups into which to divide a plurality of identified products, the products being located at respective storage locations in a collection of storage locations, wherein the software application being configured to receive selection of a number of discrete groups includes being configured to receive selection of a number of users, wherein the software application is configured to divide the identified products into discrete groups such that areas of the resulting groups of products at respective storage locations are substantially non-overlapping, and wherein the software application is configured to divide the identified products into discrete groups including numbers of products determined based upon efficiency ratings associated with respective users, at least one group including a greater number of products than at least one other group.

9. An apparatus comprising:
a processor configured to operate a software application, the software application being configured to assign discrete groups of products to respective workstation computers, the products being located at respective storage locations in a collection of storage locations, discrete groups having been formed by dividing a plurality of identified products such that the areas of the resulting groups of products at respective storage locations are substantially non-overlapping in a plane normal to a plane traversed by users to access the respective storage locations in the collection of storage locations,
wherein the processor is configured to assign discrete groups of products to respective workstation computers each of which is configured to generate and transmit, for each of one or more of the products of a respective group, a signal to a radio frequency identification (RFID) tag associated with the storage location of the respective product to thereby direct the RFID tag to generate a notification signal.

10. An apparatus according to claim 9, wherein the software application is configured to assign the groups of products to respective workstation computers each of which is configured to generate and transmit, for each of one or more of the products of a respective group, a signal to a RFID tag associated with the storage location of the respective product to thereby direct the RFID tag to activate a light emitting diode to thereby generate a notification signal.

11. A method comprising:
receiving selection of a number of discrete groups into which to divide a plurality of identified products, the products being located at respective storage locations in a collection of storage locations; and
dividing the identified products into discrete groups such that the areas of the resulting groups of products at respective storage locations are substantially non-overlapping in a plane normal to a plane traversed by users to access the respective storage locations in the collection of storage locations.

12. A method according to claim 11 further comprising:
assigning the groups of products to respective workstation computers, each workstation computer being configured to generate and transmit the signal for the products of a respective group.

13. A method according to claim 11, wherein dividing the subset of the plurality of identified products comprises dividing the subset of the plurality of identified products into discrete groups each including substantially the same number of products.

14. A method according to claim 11, wherein the plurality of products are located at respective storage locations in a collection of storage locations arranged in a matrix including one or more columns and one or more rows of storage locations, and wherein dividing the subset of the plurality of identified products comprises dividing the columns or rows of storage locations into discrete groups.

15. A method according to claim 11, wherein the plurality of products are located in bins at respective storage locations, the bins being supported by a plurality of shelving units, and wherein dividing the subset of the plurality of identified products comprises dividing the shelving units into discrete groups.

16. A method according to claim 11 further comprising:
generating and transmitting, for each of one or more of the products of each of the discrete groups, a signal to a radio frequency identification (RFID) tag associated with the storage location of the respective product to thereby direct the RFID tag to generate a notification signal.

17. A method according to claim 16, wherein generating and transmitting a signal comprises generating and transmitting a signal to a RFID tag to thereby direct the RFID tag to activate a light emitting diode to thereby generate a notification signal.

18. A method according to claim 16, wherein transmitting a signal comprises generating and transmitting a signal to a RFID tag via one or more of a plurality of selectable antennas, the antennas being selectable based on a signal strength associated with each of the antennas.

19. A method comprising:
receiving selection of a number of discrete groups into which to divide a plurality of identified products, the products being located at respective storage locations in a collection of storage locations, wherein receiving selection of a number of discrete groups comprises receiving selection of a number of users; and
dividing the identified products into discrete groups such that areas of the resulting groups of products at respective storage locations are substantially non-overlapping, wherein dividing the identified products comprises dividing the identified products into discrete groups including numbers of products determined based upon efficiency ratings associated with respective users, at least one group including a greater number of products than at least one other group.

20. A computer-readable storage medium having computer-readable program code portions stored therein, the computer-readable program code portions comprising:
a first executable portion configured to receive selection of a number of discrete groups into which to divide a plurality of identified products, the products being located at respective storage locations in a collection of storage locations; and
a second executable portion configured to divide the identified products into discrete groups such that the areas of the resulting groups of products at respective storage locations are substantially non-overlapping in a plane normal to a plane traversed by users to access the respective storage locations in the collection of storage locations.

21. A computer-readable storage medium according to claim 20, wherein the second executable portion is configured to divide the identified products into discrete groups each including substantially the same number of products.

22. A computer-readable storage medium according to claim 20, wherein the products are located at respective storage locations in a collection of storage locations arranged in a matrix including one or more columns and one or more rows of storage locations, and wherein the second executable portion being configured to divide the identified products includes being configured to divide the columns or rows of storage locations into discrete groups.

23. A computer-readable storage medium according to claim 20, wherein the products are located in bins at respective storage locations, the bins being supported by a plurality of shelving units, and wherein the second executable portion being configured to divide the identified products includes being configured to divide the shelving units into discrete groups.

24. A computer-readable storage medium according to claim 20 further comprising:
a third executable portion configured to assign the groups of products to respective workstation computers, each workstation computer being configured to generate and transmit, for each of one or more of the products of a respective group, a signal to a radio frequency identification (RFID) tag associated with the storage location of the respective product to thereby direct the RFID tag to generate a notification signal.

25. A computer-readable storage medium according to claim 24, wherein the third executable portion is configured to assign the groups of products to respective workstation computers each of which is configured to generate and transmit, for each of one or more of the products of a respective group, a signal to a RFID tag associated with the storage location of the respective product to thereby direct the RFID tag to activate a light emitting diode to thereby generate a notification signal.

26. A computer-readable storage medium according to claim 24, wherein the third executable portion is configured to assign the groups of products to respective workstation computers each of which is configured to transmit, for each of one or more of the products of a respective group, a signal to a RFID tag via one or more of a plurality of selectable antennas, the antennas being selectable based on a signal strength associated with each of the antennas.

27. A computer-readable storage medium having computer-readable program code portions stored therein, the computer-readable program code portions comprising:
a first executable portion configured to receive selection of a number of discrete groups into which to divide a plurality of identified products, the products being located at respective storage locations in a collection of storage locations, wherein the first executable portion being configured to receive selection of a number of discrete groups includes being configured to receive selection of a number of users; and
a second executable portion configured to divide the identified products into discrete groups such that areas of the resulting groups of products at respective storage locations are substantially non-overlapping, wherein the second executable portion is configured to divide the identified products into discrete groups including numbers of products determined based upon efficiency ratings associated with respective users, at least one group including a greater number of products than at least one other group.

* * * * *